(12) United States Patent
Kohn (10) Patent No.: US 8,281,567 B2
(45) Date of Patent: Oct. 9, 2012

(54) DEPLOYABLE ROCKET ENGINE IN A COMBINATION JET AND ROCKET ENGINE

(76) Inventor: Aryeh Yaakov Kohn, Ra'anana (IL)

( * ) Notice: Subject to any disclaimer, the term of this patent is extended or adjusted under 35 U.S.C. 154(b) by 994 days.

(21) Appl. No.: 11/995,112

(22) PCT Filed: Jul. 20, 2006

(86) PCT No.: PCT/IL2006/000843
§ 371 (c)(1),
(2), (4) Date: Nov. 19, 2008

(87) PCT Pub. No.: WO2007/013058
PCT Pub. Date: Feb. 1, 2007

(65) Prior Publication Data
US 2009/0120057 A1 May 14, 2009

Related U.S. Application Data

(60) Provisional application No. 60/702,610, filed on Jul. 27, 2005.

(51) Int. Cl.
*F02K 9/00* (2006.01)
*B63H 11/00* (2006.01)
(52) U.S. Cl. .......................................... 60/225; 60/204
(58) Field of Classification Search .............. 60/200.1, 60/226.1, 224, 225, 204
See application file for complete search history.

(56) References Cited

U.S. PATENT DOCUMENTS

| | | | | |
|---|---|---|---|---|
| 2,531,761 A * | 11/1950 | Zucrow | ...................... | 60/225 |
| 2,676,457 A * | 4/1954 | Kramer | ...................... | 60/257 |
| 2,713,243 A * | 7/1955 | Seaver | ...................... | 60/225 |
| 2,960,824 A * | 11/1960 | Plummer | ...................... | 60/789 |
| 3,149,461 A * | 9/1964 | Eichholtz | ...................... | 60/225 |
| 4,817,892 A * | 4/1989 | Janeke | ...................... | 244/15 |
| 4,909,031 A * | 3/1990 | Grieb | ...................... | 60/225 |
| 5,052,176 A | 10/1991 | Labatut et al. | | |
| 5,159,809 A | 11/1992 | Ciais et al. | | |
| 5,222,361 A | 6/1993 | Nelson et al. | | |
| 7,721,524 B2 * | 5/2010 | Jahnsen | ...................... | 60/224 |

\* cited by examiner

*Primary Examiner* — Ehud Gartenberg
*Assistant Examiner* — Gerald Sung
(74) *Attorney, Agent, or Firm* — Mark M Friedman (57) ABSTRACT

A propulsion system for a combined aircraft/spacecraft including: a jet engine having a longitudinal axis defined in a direction from a front end at an air intake to a rear end at a jet exhaust: a front end at an air intake to a rear end at the jet exhaust; a rocket engine having a longitudinal axis defined normal to a rear end at a rocket exhaust; a common engine housing having an elongated shape and wherein the jet engine and the rocket engine are configured substantially coaxially and with respective rear ends facing the same direction when the rocket engine is operated.

19 Claims, 5 Drawing Sheets

DEPLOYABLE ROCKET ENGINE IN A COMBINATION JET AND ROCKET ENGINE

FIELD AND BACKGROUND OF THE INVENTION

The present invention relates to propulsion in aeronautics and astronautics and, in particular, it concerns a deployable propulsion system and methods that can be used for a combined aircraft/spacecraft.

It is known that aircraft employ atmospheric propulsion systems that typically combine liquid fuel that is burnt with atmospheric oxygen to provide power and/or thrust for flight. Propulsion systems which operate in this way include: internal combustion engines (typically powering propellers); and an array of jet engines such as turboprops, fan gas turbines, ram jets and scram jets. In the specification and in the claims that follow, "jet engine" means any of the aforementioned or other variations of gas turbine engines. A reference for various jet and rocket engines, including other technological and general considerations, may be found in "The Standard Handbook for Aeronautical and Astronautical Engineers", by Davies (2002), whose disclosure is incorporated herein by reference. Because atmospheric propulsion systems utilize atmospheric oxygen, most aircraft utilizing such propulsion systems are limited to operation up to altitudes ranging from approximately 45,000 to 65,000 feet or less, depending on the specific type of system and respective system operating conditions. The wide and approximate altitude range noted above, in the following description, and in the claims which follow is referred to as an "upper altitude range".

Rocket engines, as opposed to typical aircraft propulsion systems, combine fuel (usually a fluid in liquid form, but sometimes in solid form) which is burnt with oxygen (usually in the form of an oxidizer fluid), both of which are stored and carried in the rocket, to produce thrust for flight. In the specification and in the claims that follow, "rocket engine" means any type of a rocket engine whether having liquid, solid, or gaseous fuel and oxidizer configurations. Because all of its fuel and oxidizer are carried "on-board", a rocket propulsion system does not need atmospheric oxygen and may be operated: in an atmosphere; at altitudes near or above the upper altitude range, or in outer space. However, since rocket propulsion systems must have all of their fuel and oxidizer carried on board, in addition to the necessary rocket engine components, there is a serious consideration of increased flight weight when compared to typical aircraft propulsion systems. One way of dealing with the increased weight is to incorporate disposable subsystems or to make the entire rocket propulsion system disposable once it has been operated for a specific purpose or mission. Disposability of subsystems or a disposable overall system typically contributes to increased cost. In general, and because of all of these reasons, atmospheric propulsion systems are much more widely preferred over rocket propulsion systems for atmospheric flight. Therefore, rocket propulsion systems are usually limited to non-atmospheric flight, meaning flight at very high altitude or in space.

An interesting consideration arises for a craft that is to be flown in the atmosphere and above the atmosphere and whose propulsion system or systems is/are not disposable. Labatut et al., in U.S. Pat. No. 5,052,176, whose disclosure is incorporated herein by reference, describe a propulsion system for a reusable spacecraft having a turbojet, ramjet, and rocket modes of operation. Hydrogen or exhaust gases from a gas generator drive a gas turbine, which powers an air compressor in the turbojet mode. An injection device injects hydrogen and exhaust from the gas driven turbine in the combustion chamber in the turbojet mode. In the ramjet mode, only hydrogen is injected into the combustion chamber. In the rocket mode, hydrogen and oxygen are supplied to the rocket motor. An adjustable nozzle is provided to form a variable throat convergent-divergent nozzle in the turbojet and ramjet modes and to form a divergent nozzle in the rocket mode The idea of a craft having a combined jet and rocket engine is disclosed in U.S. Pat. No. 5,159,809 by Cias and Hermant, whose disclosure is incorporated herein by reference. Cias and Hermant describe a combined propulsion engine comprising a jet and rocket engine. The jet engine comprises an air inlet device and an external nozzle which, in association with a central body, defining an air-breathing combustion chamber, while the rocket engine comprises a non-air-breathing annular combustion chamber and at least one turbo pump for feeding it with propellant. The combustion chamber of the rocket engine is disposed inside the rear of a central body and it is situated at the downstream end of the air-breathing combustion chamber. The rocket engine combustion chamber is itself delimited by a streamlined portion extending along the central body and constituting a spike, which penetrates into the throat of the external nozzle while ensuring aerodynamic continuity for the stream of combustion gases leaving the air-breathing combustion chamber. The combined engine is capable of operating alternately or simultaneously, depending on the stage of a flight.

When separate jet and rocket engines are employed in a combined aircraft/spacecraft, a distinct disadvantage is that the respective engines occupy extra space when, for example, they are mounted on the wings or externally to the fuselage of an aircraft/spacecraft. In addition to the consideration of extra space occupied by respectively externally mounted engines, another more serious disadvantage is that of additional drag caused by the rocket engine, typically not operated in lower altitudes, upon the aircraft/spacecraft when it is flown in an atmosphere.

A combined jet and rocket engine configuration, while offering an advantage of space and drag savings, due to the functioning of both the jet and rocket engine within the same fairing, has an apparent disadvantage in that such a configuration requires a special engine design, undoubtedly leading to unconventional manufacturing considerations. The use of separate, conventional respective jet and rocket engines would be advantageous from a standpoint of overall implementation of a combined jet and rocket propulsion system and from a standpoint of the reliability and safety gained by using more conventional and tested subsystems.

There is therefore a need for a deployable propulsion system for a combined aircraft/spacecraft wherein separate jet and rocket engines may be deployed to occupy substantially the same space when in operation.

SUMMARY OF THE INVENTION

The present invention is a deployable propulsion system that can be used for a combined aircraft/spacecraft.

According to the teachings of the present invention there is provided, a propulsion system for a combined aircraft/spacecraft including: a jet engine having a longitudinal axis defined in a direction from a front end at an air intake to a rear end at a jet exhaust: a front end at an air intake to a rear end at the jet exhaust; a rocket engine having a longitudinal axis defined normal to a rear end at a rocket exhaust; a common engine housing having an elongated shape and wherein the jet engine and the rocket engine are configured substantially coaxially and with respective rear ends facing the same direction when the rocket engine is operated. Most preferably, the rocket engine is adapted to be positioned in a deployed position to the rear of the jet engine exhaust when the rocket engine is operated. Preferably, the rocket engine is further adapted to be positioned in a stowed position and the jet engine and the rocket engine are not coaxially configured when the jet engine is operated. Preferably, the axes of the rocket engine and the jet engine are substantially parallel and the rocket engine is positioned outside of the common engine housing when the rocket engine is positioned in the stowed position. Most typically, a rocket positioning subsystem is adapted to position the rocket from the deployed position to the stowed position and from the stowed position the deployed position. Typically, the common engine housing has a lateral opening through which the rocket engine passes when positioned by the rocket positioning subsystem.

Preferably, the rocket positioning subsystem includes a first engine housing segment piece attached to a first lateral periphery of the rocket engine and a second engine housing segment piece attached to a second lateral periphery of the rocket engine, the first and second engine housing segment pieces located substantially 180 degrees apart. Most preferably, the first and second engine housing segment pieces are formed to respectively align with and substantially close the lateral opening when the rocket engine is positioned respectively in the deployed and in the stowed position. Most typically, the rocket positioning subsystem further includes a restraining mechanism adapted to restrain the rocket engine in the deployed position. Typically, the restraining mechanism is adapted to restrain the first and second engine housing segment pieces. Preferably, a housing louver is adapted to uncover a lateral jet exhaust opening and the louver is further adapted to be positioned within the common engine housing, behind the jet engine exhaust and before the rocket engine, so that airflow past the jet engine is directed out through the jet exhaust opening, when the rocket engine is in the deployed position. Most typically, the housing louver is adapted to cover the lateral jet exhaust opening and allow no obstruction to jet exhaust gases exiting the common engine housing when the rocket engine is in the stowed position. Typically, the lateral jet exhaust opening may include a plurality of openings covered and uncovered by a respective plurality of housing louver coverings.

There is additionally provided a method of configuring a propulsion system for a combined aircraft/spacecraft comprising the steps of: taking a jet engine having a longitudinal axis defined in a direction from a front end at an air intake to a rear end at a jet exhaust; taking a rocket engine having a longitudinal axis defined normal to a rear end at a rocket exhaust; and configuring the jet engine and the rocket engine substantially coaxially within a common engine housing having an elongated shape with respective rear ends of respective engines facing the same direction when the rocket engine is operated. Most preferably, the rocket engine is positioned in a deployed position to the rear of the jet exhaust when the rocket engine is operated. Preferably, the rocket engine is positioned in a stowed position and the jet engine and the rocket engine are not coaxially configured when the jet engine is operated.

There is additionally provided a method of operating a propulsion system for a combined aircraft/spacecraft comprising the steps of: flying the combined aircraft/spacecraft to an upper altitude range with a jet engine operating; ceasing operation of the a jet engine substantially at the upper altitude range; deploying a rocket engine behind the jet engine, within a common engine housing, wherein the jet engine and the rocket engine are configured substantially coaxially and with respective rear ends facing the same direction; and operating the rocket engine. Most preferably, a plurality of propulsion systems are controllably operated in the combined aircraft/spacecraft.

There is additionally provided a method of operating a propulsion system for a combined aircraft/spacecraft comprising the steps of: reducing the altitude of the combined aircraft/spacecraft to an upper altitude range; and stowing a rocket engine from behind the jet engine, outside of a common engine housing, wherein the jet engine and the rocket engine are configured substantially coaxially and with respective rear ends facing the same direction. Most preferably, the jet engine is operated to allow combined aircraft/spacecraft flight and landing or the combined aircraft/spacecraft controllably glides to a landing.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a deployable propulsion system and methods that can be used for a combined aircraft/spacecraft.

The principles and operation of a deployable propulsion system used for a combined aircraft/spacecraft according to the present invention may be better understood with reference to the drawings and the accompanying description.

Figure 1:
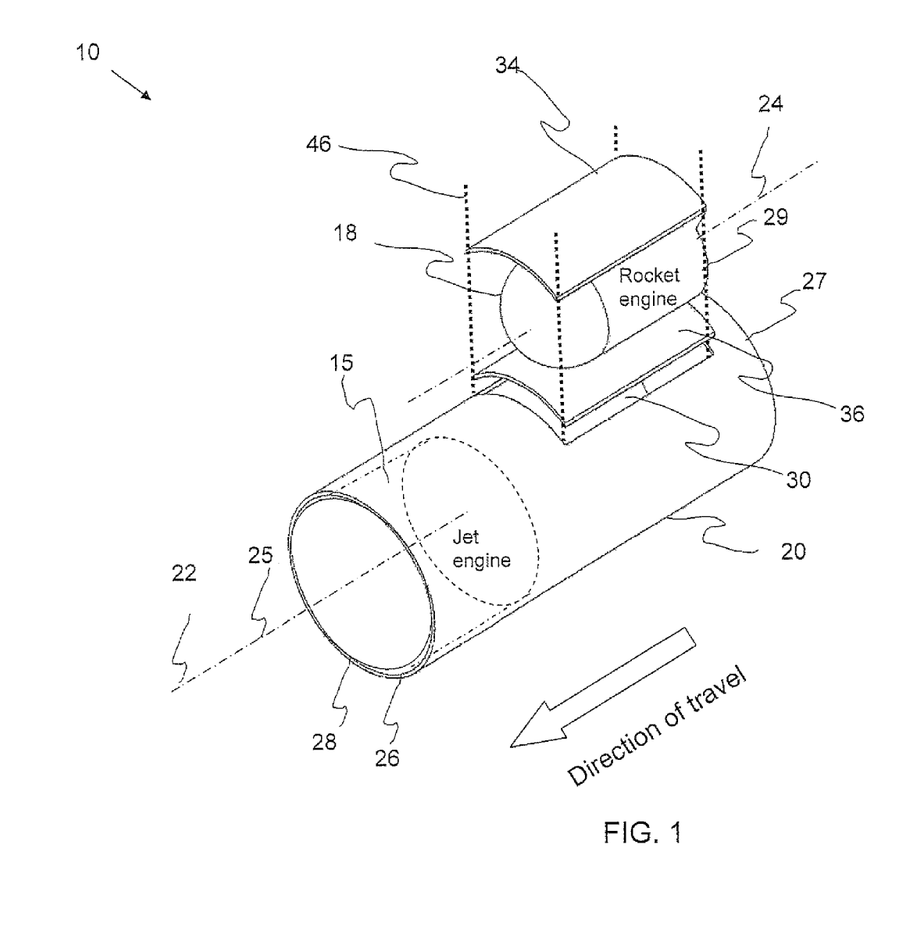
FIG. 1 is a schematic illustration of a propulsion system for a combined aircraft/spacecraft including; a jet engine; a rocket engine; and the common engine housing, in accordance with an embodiment of the current invention.

Referring now to the drawings, FIG. 1 is a schematic illustration of a propulsion system 10 for a combined aircraft/spacecraft (not shown in the figure) including a jet engine 15, a rocket engine 18, and a common engine housing 20, in accordance with an embodiment of the current invention. Jet engine 15 has an approximate cylindrical type shape and a jet engine axis 22 as indicated and rocket engine 18 has an approximate cylindrical type shape and a rocket engine axis 24 as indicated. Common engine housing 20, which typically has an elongated cylindrical-type or rectangular parallelepiped type-shape, has a housing axis 25 as indicated and an open front end 26, which faces towards the direction of travel as indicated. The term "engine housing" used herein and in the claims refers to a structure which holds the jet and the rocket engines, and which frequently has aerodynamic and/or astronomical characteristics, such as, but not limited to directing air flow in and around the jet engine, exhausting and directing air and combusted materials from the jet engine; and exhausting and directing combusted materials from the rocket engine.

Common engine housing 20 additionally has an open rear end 27, which faces away from the direction of travel, as indicated. Jet engine 15 is typically positioned towards the front end of the common engine housing with jet engine axis 22 parallel to and typically, but not always, approximately collinear with housing axis 25. Jet engine 15 is oriented within the common housing with an air intake 28 facing towards the direction of travel. Rocket engine 18 is oriented with rocket engine axis 24 generally parallel to respective axes 22 and 25, with a rocket exhaust 29 facing in opposition to the direction of travel, as indicated.

Rocket engine 18 may be positioned to a deployed position, i.e., within common engine housing 20 and with rocket engine axis 24 typically, but not always, approximately collinear with housing axis 25. In the deployed position, the rocket engine may typically be operated and the jet engine is not operated. The rocket engine may be positioned to a stowed position outside of common engine housing 20. In the stowed position, the rocket engine is typically not operated and the jet engine may typically be operated. The common engine housing has a housing opening 30 near the rear of the engine housing, through which rocket engine 18 passes when it positioned from either the deployed or the stowed position. Engine housing segment pieces 36 and 34 are attached to the rocket engine, as shown, approximately 180 degrees apart. The segment pieces are formed and positioned so that housing opening 30 is effectively aerodynamically/astrodynamically closed, as known in the art, by the respective mating housing segment pieces when the rocket is alternately stowed and deployed. (The rocket engine, as shown in a slightly exploded view in the figure, would typically be positioned somewhat closer to the common engine housing, so that engine housing segment piece 36 mates and effectively closes housing opening 30.) The following two figures further describe the deployed and stowed positions.

Figure 2A:
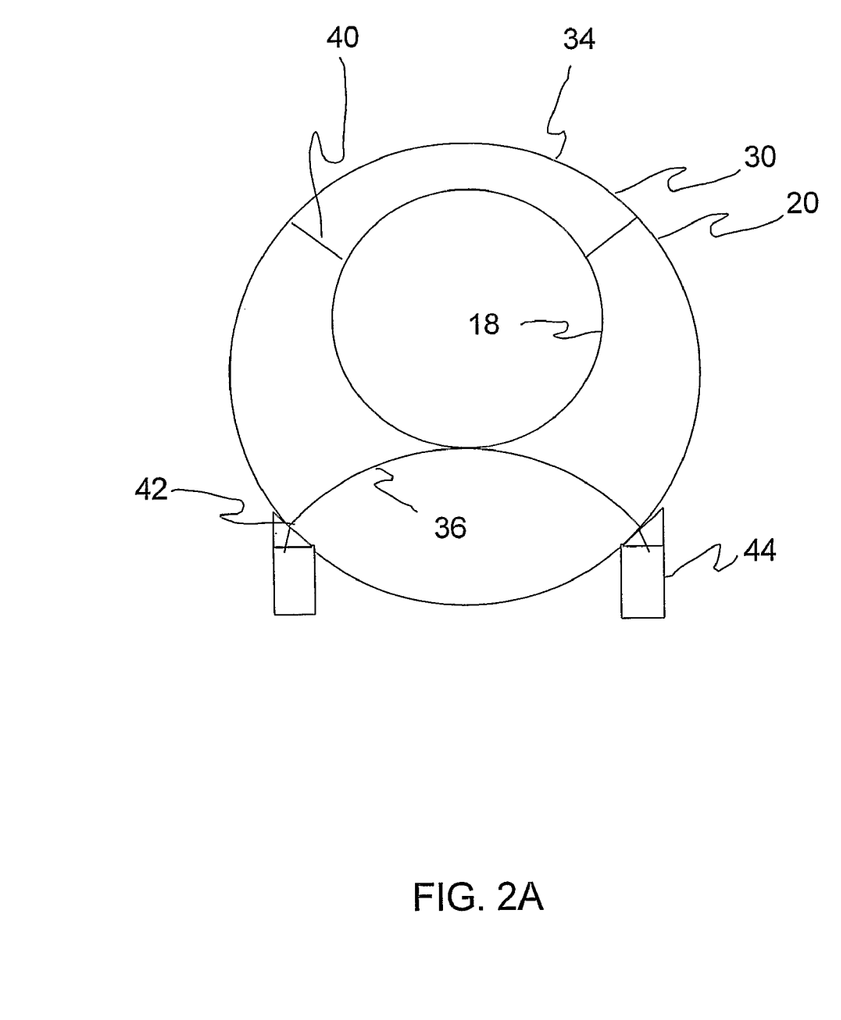
FIGS. 2A and 2B are schematic axial side views of the common engine housing and rocket engine of FIG. 1.
Figure 2B:
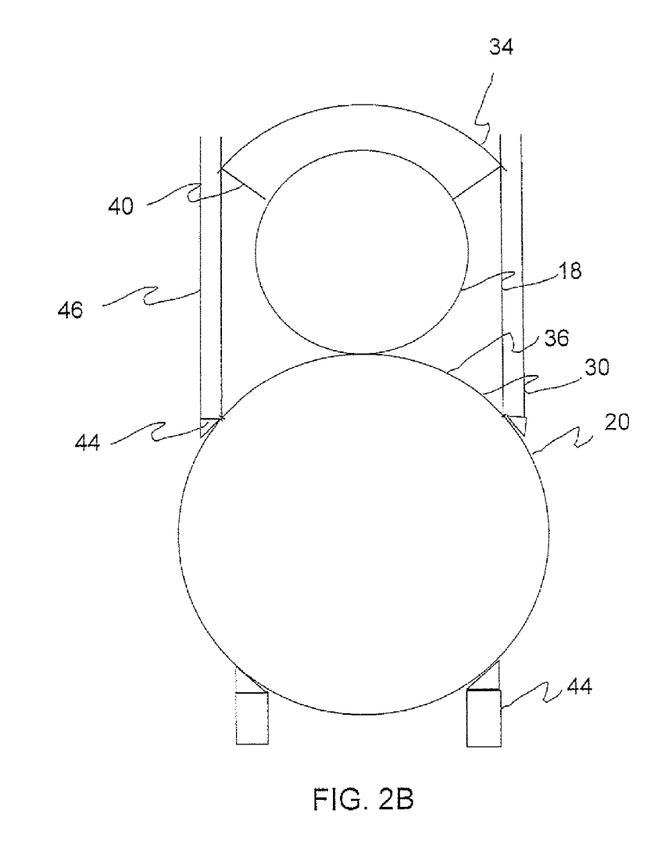

Reference is now made to FIGS. 2A and 2B, which are schematic axial views of the common engine housing and rocket engine of FIG. 1, viewed aft of the jet engine and looking opposite the direction of travel as indicated in FIG. 1. Apart from differences described hereinbelow, elements indicated by the same reference numerals of previous figures are generally identical in configuration and operation. FIG. 2A shows rocket engine 18 in the deployed position, within common engine housing 20. Struts 40 rigidly attach engine housing segment piece 34 to the rocket engine. Housing segment piece 34 mates and closes opening 30. Engine housing segment piece 36 is rigidly attached to the periphery of rocket engine 18, approximately 180 degrees in opposition from housing segment piece 34, so that edges 42 of engine housing segment piece 36 contact and mate with retention devices 44 positioned on the periphery of common engine housing 20, thereby impeding relative motion of rocket engine 18 with common engine housing 20 when the rocket engine is in the deployed position and may be operated. In one embodiment, retention devices 44 are servomechanisms that are commanded to alternately lock edges 42 when the rocket engine is deployed and to release edges 42 rocket engine when the rocket engine is stowed.

FIG. 2B shows rocket engine 18 in the stowed position, outside of common engine housing 20. In the stowed position, engine housing segment piece 36 mates and closes opening 30, yielding an unobstructed space within the common engine housing, to the rear of the jet engine (not shown in the figure).

In one embodiment of the current invention, a rocket positioning subsystem (not shown in its entirety in the figure) controls movement of rocket engine 18 and other components to effect the deployed and stowed positions. The rocket positioning subsystem has mechanical components such as, but not limited to the housing segment pieces 34 and 36; struts 40; retention devices 44; and rails or guides 46 and servomechanisms 44' to guide and to drive movement of the rocket engine and other components.

Figure 3A:
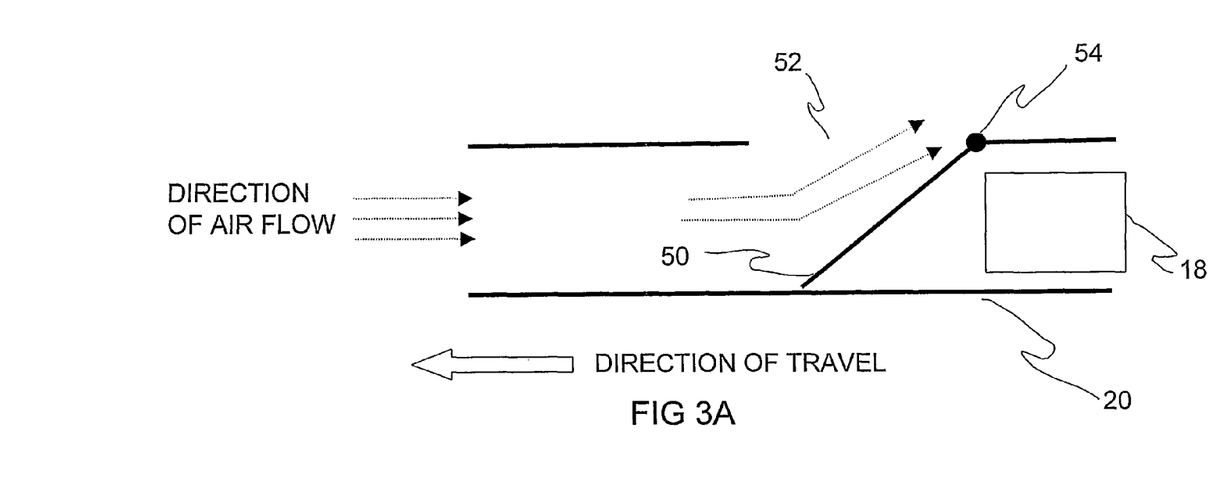
FIGS. 3A and 3B are schematic longitudinal sectional views of part of the common engine housing and rocket engine and a housing louver, in accordance with an embodiment of the current invention.
Figure 3B:
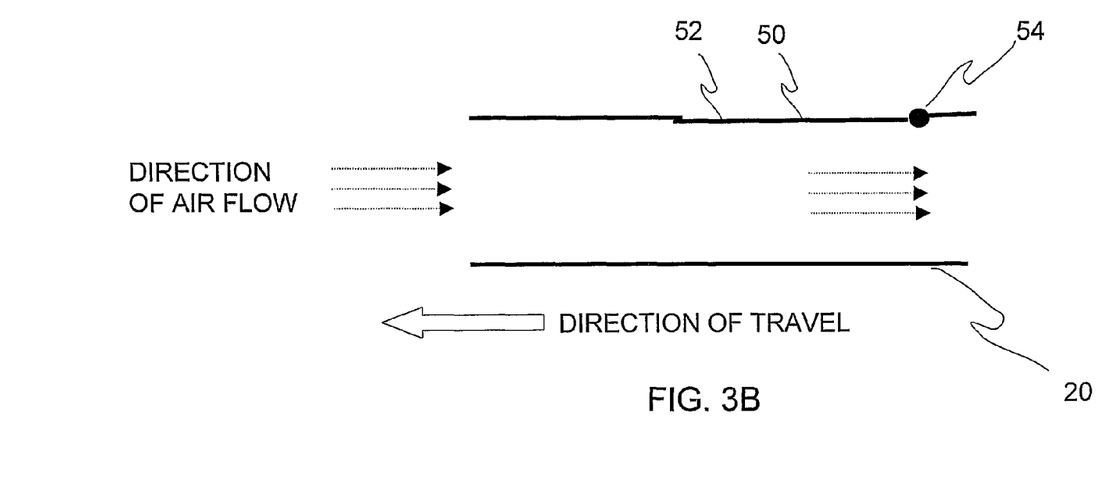

Reference is now made to FIGS. 3A and 3B, which are schematic longitudinal sectional views of part of the common engine housing, rocket engine 18, and a rocket deployment housing louver 50, in accordance with an embodiment of the current invention. Apart from differences described below, elements indicated by the same reference numerals of previous figures are generally identical in configuration and operation. During flight of the combined aircraft/spacecraft in atmospheric conditions, the propulsion system typically operates with the jet engine providing thrust and the rocket engine stowed, as previously described. A direction of travel and an opposing direction of airflow are indicated in the figures.

When, during flight or during testing, it is desired to deploy rocket engine 18, the jet engine is shut down and housing louver is then commanded to an open position before rocket engine 18, effectively blocking the space within common engine housing 20 aft of the jet engine (not shown in the figure). Movement of housing louver 50, when commanded to the position described above, also serves to open jet exhaust lateral opening 52, which had heretofore been closed by louver 50. The open position of housing louver 50 serves a dual purpose: (1) to effectively protect rocket engine 18 from high temperature exhaust still emanating from the jet engine; and (2) to direct air flow out of the common engine housing and thus serve to further cool the jet engine. FIG. 3B shows a typical situation when the jet engine (not shown) is operating and the rocket engine is stowed, with the louver closed and with air flow going through the common engine housing.

In one embodiment of the current invention, servomotor 54 is operated to position and hold (along with other optional mechanical devices, not shown in the figure) housing louver 50 in place. Louver 50 is shaped to fit the lateral shape of common engine housing and corresponding opening 52 represents an opening of the common engine housing typically ranging from 30 to 120 degrees of the housing periphery. In another embodiment of the current invention, louver 50 may include a series of louvers yielding a series of peripheral openings in the common engine housing. In such a configuration, the series of louvers would similarly provide rocket engine protection from high temperature exhaust still emanating from the jet engine and effectively direct airflow out of the common engine housing and thus serve to further cool the jet engine—as noted hereinabove.

Figure 4:
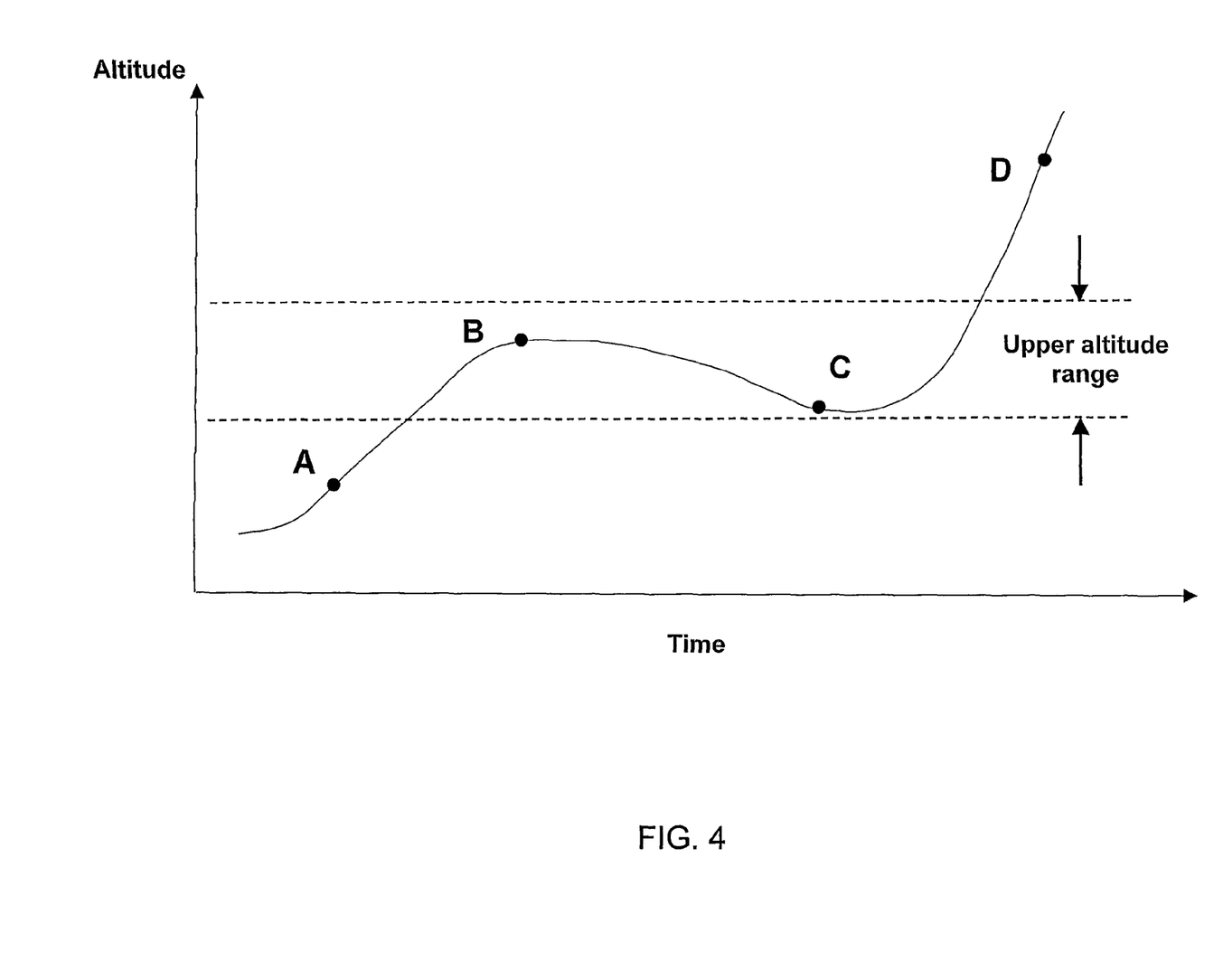
FIG. 4 is a schematic time versus altitude plot of a flight of the propulsion system of the combined aircraft/spacecraft, showing the switchover from jet engine to rocket engine at the upper altitude range, in accordance with an embodiment of the current invention.

Reference is now made to FIG. 4, which is a schematic time versus altitude plot of a flight of the propulsion system of the combined aircraft/spacecraft, before, during and after a switchover from jet engine to rocket engine power at the upper altitude range, in accordance with an embodiment of the current invention. In the figure, four points denoted as A, B, C, and D indicate events taking place at various times during the flight of the combined aircraft/spacecraft. The line connecting the four events shows typical flight altitude characteristics before and after the switchover from jet engine to rocket engine. The events, are respectively: (A) jet powered flight and climb; (B) jet engine shutdown and begin deployment of rocket engine at the upper altitude range; (C) rocket engine deployment completed and rocket engine start at approximately the upper altitude range: and (D) rocket engine flight and climb above the upper altitude range and into a space bound trajectory.

The elapsed time of rocket deployment and firing is dependent upon the aerodynamic characteristics of the combined aircraft/spacecraft and its engine configuration. When one propulsion system is used (meaning only one jet engine and one rocket engine) altitude may be lost while respective engines are switched, from point B to point C. Clearly, a shortened time of rocket deployment and firing and/or aerodynamic characteristics of the combined aircraft/spacecraft would serve to reduce the altitude loss. In another embodiment of the current invention, there are two propulsion systems and the switchover from jet engine to rocket engine in the respective propulsions systems is performed at different times, thereby contributing to a reduction of lost altitude or to no loss in altitude.

Following rocket engine firing as described hereinabove, the aircraft/spacecraft can fly at elevated altitude and/or into space. Upon completion of the elevated altitude/space flight, typically following shut-down of rocket engine operation, the altitude of the aircraft/spacecraft is reduced (such as, but not limited to, by firing of retro rockets and then adjusting the aircraft/spacecraft attitude for atmospheric re-entry) to the upper altitude range. The rocket engine is then stowed and the jet engine is started to allow a controlled flight and landing of the aircraft/spacecraft. In one embodiment of the current invention, the aircraft/spacecraft has aerodynamic characteristics which allow a controlled glide flight or so-called "dead stick landing" flight, should the jet engine not be started.

It will be appreciated that the above descriptions are intended only to serve as examples, and that many other embodiments are possible within the scope of the present invention as defined in the appended claims.

What is claimed is:

1. A propulsion system for a combined aircraft/spacecraft comprising:
   (a) a jet engine having a longitudinal axis defined in a direction from a front end at an air intake to a rear end at a jet exhaust;
   (b) a rocket engine having a longitudinal axis defined normal to a rear end at a rocket exhaust;
   (c) a common engine housing having an elongated shape and wherein the jet engine and the rocket engine are configured substantially coaxially and with respective rear ends facing the same direction when the rocket engine is operated,
   wherein the rocket engine is adapted to be positioned in a stowed position and the jet engine and the rocket engine are not coaxially configured when the jet engine is operated.

2. The propulsion system of claim 1, wherein the rocket engine is adapted to be positioned in a deployed position to the rear of the jet engine exhaust when the rocket engine is operated.

3. The propulsion system of claim 2, wherein the axes of the rocket engine and the jet engine are substantially parallel and the rocket engine is positioned outside of the common engine housing when the rocket engine is positioned in the stowed position.

4. The propulsion system of claim 3, wherein a rocket positioning subsystem is adapted to position the rocket from the deployed position to the stowed position and from the stowed position the deployed position.

5. The propulsion system of claim 4, wherein the common engine housing has a lateral opening through which the rocket engine passes when positioned by the rocket positioning subsystem.

6. The propulsion system of claim, 5, wherein the rocket positioning subsystem includes a first engine housing segment piece attached to a first lateral periphery of the rocket engine and a second engine housing segment piece attached to a second lateral periphery of the rocket engine, the first and second engine housing segment pieces located substantially 180 degrees apart.

7. The propulsion system of claim 6, wherein the first and second engine housing segment pieces are formed to respectively align with and substantially close the lateral opening when the rocket engine is positioned respectively in the deployed and in the stowed position.

8. The propulsion system of claim 7, wherein the rocket positioning subsystem further includes retention devices adapted to impede relative motion of the rocket engine with the common engine housing in the deployed position.

9. The propulsion system of claim 8, wherein the retention devices are adapted to restrain the first and second engine housing segment pieces.

10. A propulsion system of claim 2, wherein a housing louver is adapted to uncover a lateral jet exhaust opening and the louver is further adapted to be positioned within the common engine housing, behind the jet engine exhaust and before the rocket engine, so that airflow past the jet engine is directed out through the jet exhaust opening, when the rocket engine is in the deployed position.

11. A propulsion system of claim 10, wherein the housing louver is adapted to cover the lateral jet exhaust opening and allow no obstruction to jet exhaust gases exiting the common engine housing when the rocket engine is in the stowed position.

12. A propulsion system of claim 10, wherein the lateral jet exhaust opening may include a plurality of openings covered and uncovered by a respective plurality of housing louver coverings.

13. A method of configuring a propulsion system for a combined aircraft/spacecraft comprising the steps of
   (a) taking a jet engine having a longitudinal axis defined in a direction from a front end at an air intake to a rear end at a jet exhaust;
   (b) taking a rocket engine having a longitudinal axis defined normal to a rear end at a rocket exhaust; and
   (c) configuring the jet engine and the rocket engine substantially coaxially within a common engine housing having an elongated shape with respective rear ends of respective engines facing the same direction when the rocket engine is operated,
   Wherein the rocket engine is positioned in a stowed position and the jet engine and the rocket engine are not coaxially configured when the jet engine is operated.

14. The method of claim 13, wherein the rocket engine is positioned in a deployed position to the rear of the jet exhaust when the rocket engine is operated.

15. A method of operating a propulsion system for a combined aircraft/spacecraft comprising the steps of: (a) flying the combined aircraft/spacecraft to an upper altitude range with a jet engine operating with a jet engine operating and a rocket engine stowed non-coaxially with the jet engine outside of a common engine housing; (b) ceasing operation of the a jet engine substantially at the upper altitude range; (c) deploying the rocket engine behind the jet engine, within the common engine housing, wherein the jet engine and the rocket engine are configured substantially coaxially and with respective rear ends facing the same direction; and (d) operating the rocket engine.

16. A method of claim 15, wherein a plurality of propulsion systems are controllably operated in the combined aircraft/spacedraft. allow combined aircraft/spacecraft flight and landing.

17. A method of operating a propulsion system for a combined aircraft/spacecraft comprising the steps of: (a) operating a rocket engine behind a jet engine within a common engine housing wherein the jet engine and the rocket engine are configured substantially coaxially and with respective rear ends facing the same directions at an altitude; (b) reducing the altitude of the combined aircraft/spacecraft to an upper altitude range; and (c) stowing the rocket engine from behind the jet engine, outside of the common engine housing, wherein the jet engine and the rocket engine are not coaxially configured when the rocket engine is stowed.

18. A method of claim 17, wherein the jet engine is operated to allow combined aircraft/spacecraft flight and landing.

19. A method of claim 17, wherein the combined aircraft/spacecraft controllably glides to a landing.

\* \* \* \* \*

UNITED STATES PATENT AND TRADEMARK OFFICE
CERTIFICATE OF CORRECTION

| | | |
|---|---|---|
| PATENT NO. | : 8,281,567 B2 | Page 1 of 1 |
| APPLICATION NO. | : 11/995112 | |
| DATED | : October 9, 2012 | |
| INVENTOR(S) | : Aryeh Yaakov Kohn | |

It is certified that error appears in the above-identified patent and that said Letters Patent is hereby corrected as shown below:

Claim 15 column 8:
Line 58 should be corrected as follows:
Change:
-- a jet engine substantially at the upper altitude range; (c) --
to
"jet engine substantially at the upper altitude range; (c)"

Claim 16 column 8:
Line 66 should be corrected as follows:
Change:
-- spacedraft. allow combined aircraft/spacecraft flight and --
to
"spacedraft."

Claim 16 column 8, line 67:
Delete: "landing."

Signed and Sealed this
Fourth Day of December, 2012

David J. Kappos
*Director of the United States Patent and Trademark Office*